Aug. 18, 1931.  A. C. LINDGREN ET AL  1,819,684
TRACTOR IMPLEMENT
Filed July 1, 1929   2 Sheets-Sheet 1
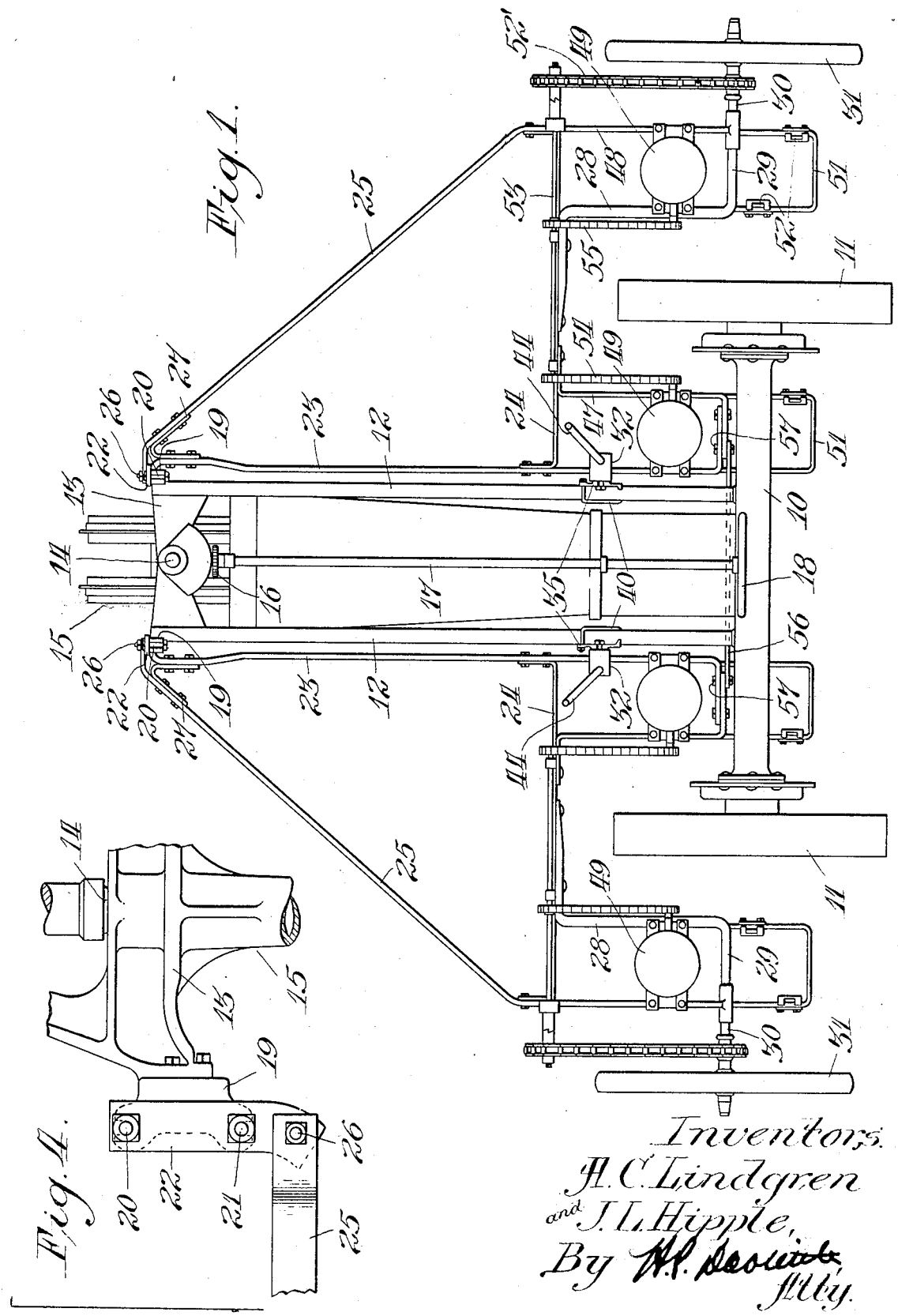

Aug. 18, 1931.   A. C. LINDGREN ET AL   1,819,684
TRACTOR IMPLEMENT
Filed July 1, 1929   2 Sheets-Sheet 2
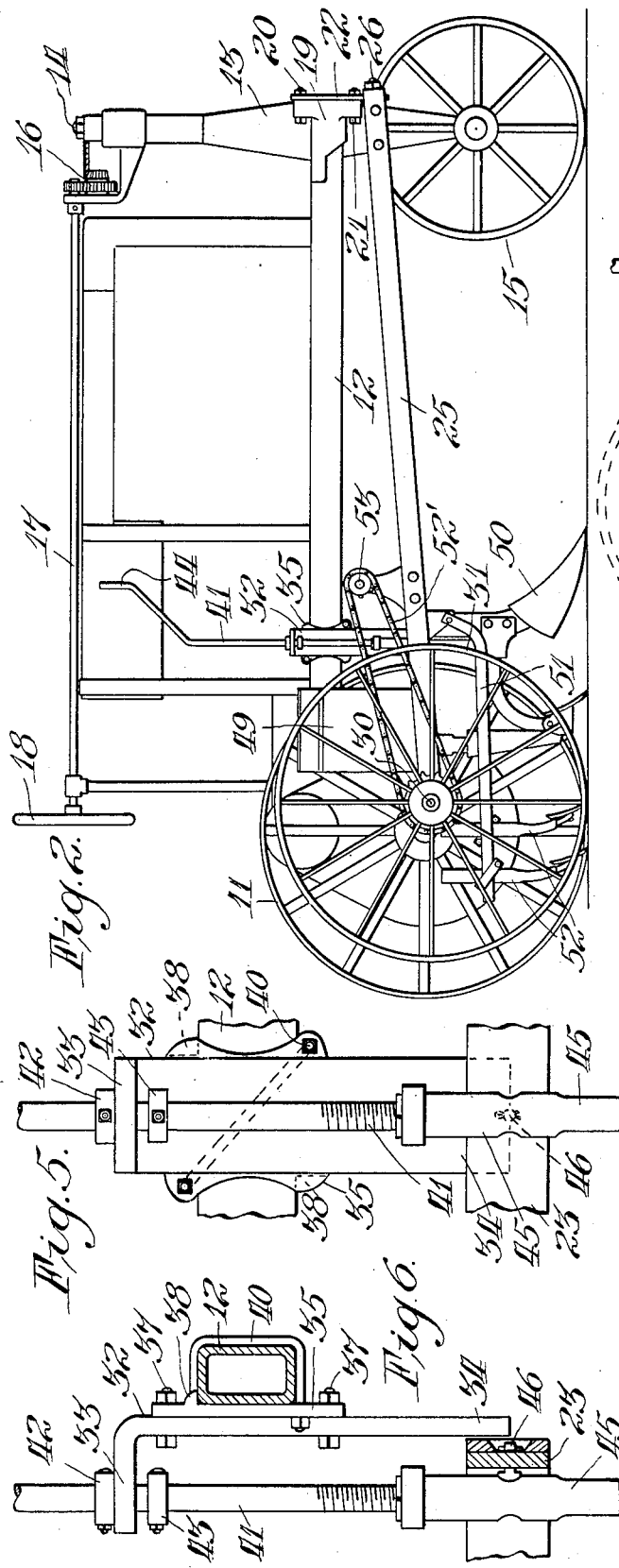
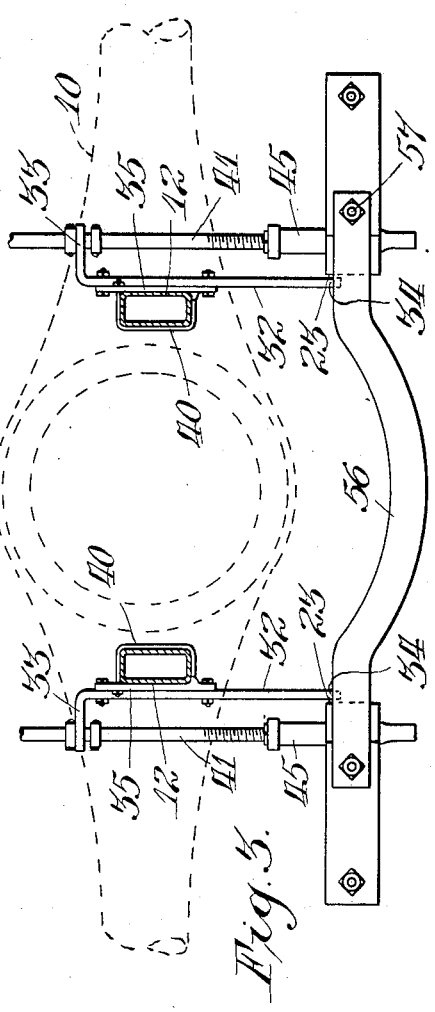
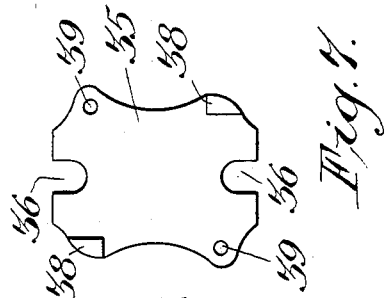
Inventors.
A. C. Lindgren
and J. L. Hipple,
By
Atty.

Patented Aug. 18, 1931

1,819,684

UNITED STATES PATENT OFFICE

ALEXUS C. LINDGREN, OF CHICAGO, AND JAMES L. HIPPLE, OF CANTON, ILLINOIS, ASSIGNORS TO INTERNATIONAL HARVESTER COMPANY, A CORPORATION OF NEW JERSEY

TRACTOR IMPLEMENT

Application filed July 1, 1929. Serial No. 375,173.

The present invention relates to self-propelled farm implements, and, in particular, to a tractor-planter organization involving the combination of row crop planting units with tractors of standard types.

The objects of the invention are to provide an implement frame, or frames, carrying planting units, or equivalent row crop implements, so connected to the sides of a tractor as to dispose the planting units on a transverse line adjacent the tractor wheels and in position for observation from the operator's station on a tractor, and to connect the implement frames to the tractor in a manner to provide flexibility, ease of control of the machine as a whole, and general simplicity of structure. More specifically, the main object of the invention is to provide a four-row cotton or corn planter having a tractor as its basis and comprising simple and easily attachable hinged side frames as the planter carrying means.

The invention accordingly resides in the organization and details of construction and equivalents thereof hereinafter described and defined in the claims.

A preferred embodiment is illustrated in the accompanying drawings, where,—

Figure 1 is a plan view of a tractor planter organization embodying the invention;

Figure 2 is a side elevation of the same;

Figure 3 is an enlarged detail view showing the planter frame hangers as viewed from the rear of the tractor with the side sills of the tractor body shown in section;

Figure 4 is an enlarged detail view of a forward hinge connection for the planter frames;

Figure 5 is an enlarged detail view of one of the frame hangers seen in side elevation;

Figure 6 shows the same parts viewed at right angles to Figure 5; and

Figure 7 is a detail of a clamp plate.

In the present instance, the invention has been illustrated as embodied in an organization comprising a self-propelled vehicle or tractor having an arched rear axle structure 10 supported on traction wheels 11, which are laterally spaced in a manner to span the ground space ordinarily required for two plant rows of such crops as corn or cotton. The tractor has a narrow, central body comprising side members or sills 12 secured at the rear ends to the axle structure 10 and connected at the front by a cross head 13, in which there is swiveled the vertical standard 14 of a steering truck 15. The truck standard 14 is connected by suitable gearing at 16 to a steering rod 17 having a steering wheel 18 adjacent the operator's station at the rear of the tractor.

The side members 12 support the power plant transmission mechanism, etc. of the tractor in the usual manner, and which together constitute the narrow body referred to. The forward end of each side member 12 of the tractor body has secured to it a bracket 19 (Figure 4) formed with oppositely facing notches or slots which receive the bolts 20 and 31 for securing thereto a depending hinge bar 22. As the attaching means and frames at each side of the tractor body are identical in structure, it will be necessary to describe one side only, it being understood that the construction is duplicated at the other side of the tractor.

The hinge bar or plate 22 above referred to is provided with an aperture in its lower end. This aperture serves as the forward point of connection for a side attached planter frame comprising an elongated member 23 extending alongside the tractor body in parallel relation thereto and substantially coextensive with said body. At a point immediately forward of a traction wheel 11, the member 23 has secured to it a laterally extending frame bar 24, which extends outwardly beyond the traction wheel for a distance approximately equal to one-half the length of the bar 24. A diagonal member or brace 25 connects the outer end of the bar 24 to the forward end of the longitudinal bar 23 forming a rigid triangular frame. The forward ends of the bars 23 are bent laterally in parallel spaced relation, as best shown in Figure 1, and are apertured to receive a hinge bolt 26, which is received in the aperture in the lower end of the hinge plate 22. An angle brace 27 preferably is used to rigidly connect the forward ends of the members 23 and 25. The outwardly extending bar 24 has secured thereto at approximately the middle of its rear surface, one arm of an angular rearwardly extending axle support or crank 28 which is bent outwardly at 29 and terminates as a spindle or axle 30 on which is journaled a ground wheel 31. The outwardly bent end 29 and spindle 30 are so disposed as to be approximately in alignment with the axis of the rear wheels 11 of the tractor, as best seen in Figure 2. The wheel 31 supports the outer side of the attachment frame. In order to provide support for the inner side of the frame, there is provided a hanger bracket (Figures 5 and 6), comprising an upright plate 32 having a horizontal, outwardly bent portion 33 at its upper end, and having its lower end 34 depending some distance below the tractor body. The hanger member or bar 32 is preferably clamped to a plate 35, which has opposite notches 36 receiving clamp bolts 37 passing through the hanger member 32. The plate 35 is preferably formed with lugs 38 spaced to engage the upper and lower sides of the side member 12 of the tractor body and with opposite apertures 39 to receive the ends of a U-bolt 40 embracing the side member 12. The hanger 32 is thus rigidly mounted on the side member 12, but may be easily detached from the plate 35 by removing one of the bolts 37 and loosening the other. The horizontal upper end 33 of the hanger bracket has an aperture receiving a vertically depending support shaft 41. This shaft is provided with bearing collars 42 and 43 above and below the extension 33, which collars are preferably spaced, as illustrated in Figures 5 and 6, to provide loose suspension and some vertical play for the shaft 41.

The shaft 41 is formed with a crank handle 44 at its upper end and has its lower end screw-threaded and engaged in a threaded sleeve 45, which is provided at one side with a trunnion 46 received in an aperture formed in the rear portion of the elongated bar 23. The lower end 34 of the hanger bracket serves as an abutment and guide for the rear portion of the member 23, as best seen in Figures 5 and 6. The hanger construction just described accordingly provides a readily adjustable supporting means for the inner rear portion of the attachment frame, which permits the frame to be properly leveled as desired, by rotation of the shaft 41. It will also be seen that the spaced relation of the collars 42, 43 will permit the attachment frame to have the necessary amount of free floating movement independently of the tractor. In order to provide support for planting units, the outwardly extending member 24 of the attachment frame is provided with rearwardly extending bars at 47 and 48, which are disposed in horizontally spaced, parallel relation. These bars are preferably secured to the outwardly bent rear end of bar 23 and to the arm 29 of the axle member respectively, and form rectangular, open, rearwardly extending frames, each of which supports a planting unit 49, as seen in Figure 1. These units are located at points forward of the axle 10 of the tractor and within the transverse vertical planes containing the rear wheels 11. Each planting unit will preferably include the usual furrow opener 50, (Figure 2), and rearwardly extending pivoted frames 51 carrying covering tools 52.

The planting mechanism comprised in the units 49 will preferably be driven from the supporting wheel 31 as by a sprocket chain 52' driving a counter-shaft 53 journaled on the member 24 and having sprocket chain connections at 54 and 55 with the respective planting units.

In order to maintain the two attachment frames at opposite sides of the tractor in proper parallel position, the rear ends of the frames are preferably connected by a tie-bar 56 pivotally connected at 57 to the rear ends of the inner planter unit supporting frames.

With the construction and organization above described, there is provided a tractor planter organization characterized by employment of four equally spaced planting units mounted in pairs on opposite sides of the tractor and located within the transverse vertical planes containing the rear wheels of the tractor. The construction also provides for necessary flexibility of the lateral frames which are hinged at their forward ends to the tractor body on longitudinal axes at 26 and loosely suspended from the tractor body at their inner rear ends. The position of the planter units adjacent the rear axle structure of the tractor and with the outer supporting wheels 31 approximately in alignment with the rear wheel axis permits the tractor to be steered and turned without interference from the lateral frames and allows the planting units to be operated under the observation of the driver of the tractor from his position at the rear thereof.

The foregoing structure exemplifies a preferred embodiment of the invention, which may, however, be modified without departure from the scope of the invention as defined in the following claims.

What is claimed is:

1. A tractor planter comprising the combination with a self-propelled vehicle having a rear axle and wheels adapted to span the space of two plant rows and a narrow central body supported at the front on a steering truck positioned on a line midway between the rear wheels, of a frame at each side of the vehicle body, each frame having an elongated member extending alongside the body and forwardly pivoted thereto, connecting means loosely suspending the rear end of each member on the vehicle, freely movable connecting means between the rear ends of said members, an outwardly extending bar fixed to each member and projecting laterally therefrom ahead of each rear wheel, a ground wheel supporting the outer end of each outwardly extending bar, and planting mechanism carried by each outwardly extending bar.

2. The combination of claim 1, the planting mechanism carried by each bar being located within the transverse vertical planes containing the rear vehicle wheels.

3. A tractor planter comprising the combination with a self-propelled vehicle having a rear axle and wheels adapted to span the space of two plant rows and a narrow central body supported at the front on a steering truck positioned on a line midway between the rear wheels, of a frame at each side of the vehicle body, each frame having an elongated member extending alongside the body and forwardly pivoted thereto, connecting means loosely suspending the rear end of each member on the vehicle, freely movable connecting means between the rear ends of said members, an outwardly extending bar fixed to each member and projecting laterally therefrom ahead of each rear wheel and having substantially half its length beyond said wheel, a ground wheel supporting the outer end of each outwardly extending bar, and a pair of planting units carried by each outwardly extending bar, all said planting units being uniformly spaced and the units of each pair being located at each side of the tread line of the respective rear vehicle wheels.

4. A tractor planter comprising the combination with a self-propelled vehicle having a rear axle and wheels adapted to span the space of two plant rows and a narrow central body supported at the front on a steering truck positioned on a line midway between the rear wheels, of a frame at each side of the vehicle body, each frame having an elongated member extending alongside the body and forwardly pivoted thereto, connecting means loosely suspending the rear end of each member on the vehicle, freely movable connecting means between the rear ends of said members, an outwardly extending bar fixed to each member and projecting laterally therefrom ahead of each rear wheel and having substantially half its length beyond said wheel, a rearwardly extending support on the end of each bar having a spindle positioned in approximate alignment with the axis of the rear vehicle wheels, a ground wheel on each spindle, and a pair of planting units carried by each outwardly extending bar, all said planting units being uniformly spaced and located at each side of the tread line of the respective rear vehicle wheels.

5. The combination of claim 4, the planting mechanisms carried by each bar being located forwardly of the vehicle axle and within the transverse vertical planes containing the rear vehicle wheels.

6. A tractor planter comprising the combination with a self-propelled vehicle having a rear axle and wheels adapted to span two plant rows and a narrow central body supported at the front on a steering truck positioned on a line midway between the rear wheels, of a frame at the side of the vehicle body having an elongated member extending alongside and parallel to the body, a pivotal connection between the forward end of said member and the body, a hanger bracket secured to the side of the vehicle body rearwardly of said pivotal connection, a depending shaft journaled in said bracket, a threaded sleeve pivotally connected to the rear portion of said member and engaged by a threaded end of said shaft, a frame member secured to the rear portion of said elongated member and extending outwardly, a ground engaging support on the end thereof, and planting mechanism carried by said outwardly extending member.

7. A tractor planter comprising the combination with a self-propelled vehicle having a rear axle and wheels adapted to span two plant rows and a narrow central body supported at the front on a steering truck positioned on a line midway between the rear wheels, of a frame at the side of the vehicle body having an elongated member extending alongside and parallel to the body, a pivotal connection between the forward end of said member and the body, a hanger bracket secured to the side of the vehicle body rearwardly of said pivotal connection, a vertically adjustable supporting link between said bracket and the rear end of said elongated member, a frame member secured to the rear portion of said elongated member and extending outwardly therefrom with substantially half its length projecting beyond the rear vehicle wheel, a rearward extension on the end of the outwardly extending member, a ground wheel on the end of said extension, a pair of planting units carried by the outwardly extended frame member with the units of the pair disposed on opposite sides of the tread line of said rear vehicle wheel, and driving means between said ground wheel and the planting units.

8. The combination with a tractor having rear traction wheels, of a frame pivotally connected to one side of the tractor and having a laterally extended portion projecting beyond the traction wheel on that side, implement supporting frames extending rearwardly from said laterally extended portion and located at opposite sides of said traction wheel, and a ground wheel supporting the outer end of the laterally extended portion and journaled on a spindle secured to the laterally extending portion and extending on an axis substantially in alignment with that of the traction wheel.

In testimony whereof we affix our signatures.

ALEXUS C. LINDGREN.
JAMES L. HIPPLE.